United States Patent [19]

Oshima

[11] Patent Number: 5,736,605
[45] Date of Patent: Apr. 7, 1998

[54] VINYL CHLORIDE RESIN COMPOSITION

[75] Inventor: Masabumi Oshima, Nagoya, Japan

[73] Assignee: Mitsubishi Chemical MKV Company, Tokyo, Japan

[21] Appl. No.: 661,963

[22] Filed: Jun. 12, 1996

[30] Foreign Application Priority Data

Jun. 14, 1995 [JP] Japan ................... 7-147295

[51] Int. Cl.$^6$ ............. C08L 27/06; C08L 33/12; C08L 9/02; C08L 19/00
[52] U.S. Cl. ............. 524/521; 524/523; 524/525; 524/527; 524/569
[58] Field of Search ............. 524/521, 523, 524/525, 527, 569

[56] References Cited

U.S. PATENT DOCUMENTS

| | | |
|---|---|---|
| 2,330,353 | 9/1943 | Henderson . |
| 2,791,600 | 5/1957 | Schwaegerle . |
| 2,880,901 | 4/1959 | Zipper et al. . |
| 5,314,941 | 5/1994 | Yamanaka et al. ............. 524/425 |
| 5,362,787 | 11/1994 | Ngoc et al. . |
| 5,484,844 | 1/1996 | Oshima et al. ............. 524/569 |
| 5,532,068 | 7/1996 | Oshima et al. ............. 428/520 |
| 5,554,683 | 9/1996 | Oshima ............. 524/569 |

FOREIGN PATENT DOCUMENTS

| | | |
|---|---|---|
| 0 353 525 | 2/1990 | European Pat. Off. . |
| 0 469 521 | 2/1992 | European Pat. Off. . |
| 0 565 984 | 10/1993 | European Pat. Off. . |
| 0 675 163 | 10/1995 | European Pat. Off. . |
| 62-54347 | 11/1987 | Japan . |
| 4-47707 | 8/1992 | Japan . |
| 1059428 | 2/1967 | United Kingdom . |

OTHER PUBLICATIONS

Database WPI, Derwent Publications, AN–90–087760, JP–A–02 041 349, Feb. 9, 1990.
Database WPI, Derwent Publications, AN 89–344239, JP–A–01 256 554, Oct. 13, 1989.

Primary Examiner—Peter A. Szekely
Attorney, Agent, or Firm—Oblon, Spivak, McClelland, Maier & Neustadt, P.C.

[57] ABSTRACT

A vinyl chloride resin composition comprising 100 parts by weight of a vinyl chloride resin, from 20 to 200 parts by weight of a plasticizer, from 10 to 250 parts by weight of a rubber material containing from 20 to 95 wt % of a gel content insoluble in tetrahydrofuran, and from 0.5 to 30 parts by weight of an acrylic resin obtained by copolymerizing from 20 to 50 wt % of methyl methacrylate with from 80 to 50 wt % of at least one monomer selected from the group consisting of acrylates, methacrylates (other than methyl methacrylate) and styrene.

6 Claims, No Drawings

VINYL CHLORIDE RESIN COMPOSITION

The present invention relates to a vinyl chloride resin composition which is excellent in extrusion moldability and less susceptible to heat deterioration even during long run extrusion molding and a molded product of which is excellent in the creep resistance and compression set properties.

A soft vinyl chloride resin composition is commonly used as e.g. a material for gaskets, since it is readily moldable, flexible and rich in elasticity. However, it is inferior in creep resistance and compression set properties, and it has been attempted to increase the degree of polymerization of the vinyl chloride resin or to introduce a crosslinking structure into the vinyl chloride resin. Even then, however, such a vinyl chloride resin is substantially inferior in creep resistance and compression set to vulcanized rubber. Accordingly, a composition having the compression set property improved by kneading a partially crosslinked rubber, particularly a partially crosslinked acrylonitrile-butadiene rubber thereto, is disclosed in e.g. Japanese Examined Patent Publication No. 54347/1987. Further, Japanese Examined Patent Publication No. 47707/1992 proposes to add a methyl methacrylate copolymer containing at least 50 wt % of methyl methacrylate and having the range of the specific viscosity specified, for the purpose of improving the appearance of a molded product obtained from such a composition.

However, such a composition did not have adequate dynamic heat stability i.e. heat stability during kneading or during extrusion molding and thus had problems that during the extrusion molding, a molten resin was likely to adhere to the screw or die of the extruder, or the resin was likely to remain and undergo heat deterioration at a portion such as a joint portion of an adapter where the flow of the resin was poor, which made long run of extrusion molding difficult. Accordingly, improvement in the dynamic heat stability has been desired.

In view of these problems, the present inventors have conducted extensive studies to improve the dynamic heat stability and as a result, have found that by incorporating an acrylic resin having a relatively small content of methyl methacrylate in place of the above mentioned methyl methacrylate copolymer, the dynamic heat stability can be improved, and the long run extrusion moldability can be improved, while the creep resistance and compression set properties are excellent. The present invention has been accomplished on the basis of this discovery.

Namely, it is an object of the present invention to provide a vinyl chloride resin composition excellent in creep resistance and compression set properties and having good long run extrusion moldability.

Thus, the present invention provides a vinyl chloride resin composition comprising 100 parts by weight of a vinyl chloride resin, from 20 to 200 parts by weight of a plasticizer, from 10 to 250 parts by weight of a rubber material containing from 20 to 95 wt % of a gel content insoluble in tetrahydrofuran, and from 0.5 to 30 parts by weight of an acrylic resin obtained by copolymerizing from 20 to 50 wt % of methyl methacrylate with from 80 to 50 wt % of at least one monomer selected from the group consisting of acrylates, methacrylates (other than methyl methacrylate) and styrene.

Now, the present invention will be described in detail.

The vinyl chloride resin as an essential resin component in the composition of the present invention may be any resin produced by polymerizing vinyl chloride or a mixture of vinyl chloride with a copolymerizable comonomer by a conventional method such as suspension polymerization, bulk polymerization, fine suspension polymerization or emulsion polymerization. The comonomer may, for example, be a vinyl ester such as vinyl acetate, vinyl propionate or vinyl laurate, an acrylate such as methyl acrylate, ethyl acrylate or butyl acrylate, a methacrylate such as methyl methacrylate or ethyl methacrylate, a maleate such as dibutyl maleate or diethyl maleate, a fumarate such as dibutyl fumarate or diethyl fumarate, a vinyl ether such as vinyl methyl ether, vinyl butyl ether or vinyl octyl ether, a vinyl cyanide such as acrylonitrile or methacrylonitrile, an α-olefin such as ethylene or propylene, a vinylidene halide or vinyl halide other than vinyl chloride, such as vinylidene chloride or vinyl bromide, or a polyfunctional monomer such as diallyl phthalate or ethylene glycol dimethacrylate. The comonomer is not limited to those mentioned above. The comonomer is used usually within a range of at most 30 wt %, preferably at most 20 wt %, in the constituting components for the vinyl chloride resin.

Further, the vinyl chloride resin includes also a chlorinated vinyl chloride resin obtained by chlorinating the vinyl chloride resin produced as described above.

To such a vinyl chloride resin, a polymer compound compatible with the vinyl chloride resin can be added. Such a polymer compound may, for example, be an ethylene/vinyl acetate copolymer, an ethylene/acrylate copolymer, an ethylene/vinyl acetate/carbon monoxide copolymer or a chlorinated polyethylene. Such a polymer compound is incorporated in an amount within a range of not more than 150 parts by weight, preferably not more than 100 parts by weight, per 100 parts by weight of the vinyl chloride resin.

The composition of the present invention will be plasticized by incorporation of a plasticizer, whereby kneading and processing will be facilitated, and the compression set will be improved. The plasticizer is not particularly limited so long as it is the one commonly employed for a vinyl chloride resin, and it may, for example, be a phthalate plasticizer such as dibutyl phthalate (DBP), dihexyl phthalate, di-2-ethylhexyl phthalate (DOP), di-n-octyl phthalate or diisodecyl phthalate; an aliphatic dibasic acid ester plasticizer such as dioctyl adipate, diisodecyl adipate or dioctyl sebacate; a trimellitate plasticizer such as trioctyl trimellitate (TOTM) or tridecyl trimellitate; a phosphate plasticizer such as tricresyl phosphate (TCP), triphenyl phosphate, trixylyl phosphate, trioctyl phosphate, octyldiphenyl phosphate, cresyldiphenyl phosphate, tributoxyethyl phosphate, trichloroethyl phosphate, tris(3-chloropropyl) phosphate, tris(2,3-dichloropropyl) phosphate, tris(2,3-dibromopropyl) phosphate, tris (bromochloropropyl) phosphate, bis(2,3-dibromopropyl)-2,3-dichloropropyl phosphate, bis(chloropropyl) monoctyl phosphate or a halogen-containing polyphosphate; a polyester polymer plasticizer; an epoxy plasticizer such as epoxidized soybean oil, epoxidized linseed oil or a liquid epoxy resin; a chlorinated paraffin; or a chlorinated fatty acid ester such as an alkyl ester of pentachlorostearic acid. These plasticizers may be used alone or in combination as a mixture of two or more of them.

The amount of the plasticizer to be incorporated varies depending upon the type of the vinyl chloride resin, the type and the amount of the rubber material, the presence or absence of a filler, etc. However, it is usually selected within a range of from 20 to 200 parts by weight, preferably from 30 to 150 parts by weight, per 100 parts by weight of the vinyl chloride resin.

The rubber material incorporated in the vinyl chloride resin composition of the present invention is required to contain a so-called gel content i.e. a crosslinked component insoluble in tetrahydrofuran (hereinafter referred to as THF), and the gel content is preferably at least 20 wt %, more preferably at least 50 wt %. The gel content in the rubber material is preferably contained in the rubber material from the beginning. However, a crosslinking agent may be incorporated at the time of the preparation of the vinyl chloride resin composition, and the rubber material containing or not containing a gel content and the crosslinking agent may be reacted for crosslinking during kneading to increase or form the gel content. If the gel content is less than 20 wt %, it tends to be difficult to obtain an adequate effect for improving the compression set property.

The gel content is measured in such a manner that 40 ml of THF at 25° C. is added to 1 g of a sample of the rubber material, and the mixture is left to stand still; upon expiration of 12 hours, the supernatant THF is removed; this operation is repeated a few times, whereupon the insoluble residue is dried, and the gel content is calculated from the weight.

The rubber material may be various types of rubber, such as acrylonitrile/butadiene rubber (nitrile rubber, NBR), methyl methacrylate/butadiene/styrene rubber (MBS), acrylic rubber (AR), styrene/butadiene rubber (SBR), chloroprene rubber (CR), urethane rubber (UR), and rubber materials having THF-insoluble crosslinking components introduced to such rubber materials. Among them, it is preferred to use NBR or AR containing a gel content i.e. a THF insoluble crosslinking component.

The rubber material containing a gel content may be prepared by introducing a crosslinking structure by a method of adding a polyfunctional monomer to the polymerization system at the time of the preparation of the rubber material, or by a method of treating the rubber after preparation with a crosslinking agent such as an organic peroxide or sulfur, for crosslinking.

The content of the rubber material in the composition is usually from 10 to 250 parts by weight, preferably from 15 to 200 parts by weight, more preferably from 15 to 150 parts by weight, per 100 parts by weight of the vinyl chloride resin.

The acrylic resin as an essential component in the composition of the present invention is required to be a copolymer of a composition comprising from 20 to 50 wt %, preferably from 25 to 45 wt %, of methyl methacrylate and the rest of from 80 to 50 wt %, preferably from 75 to 55 wt %, of at least one monomer selected from the group consisting of an acrylate, a methacrylate other than methyl methacrylate, and styrene. The acrylate may, for example, be methyl acrylate, ethyl acrylate, butyl acrylate, or 2-ethylhexyl acrylate. The methacrylate may, for example, be ethyl methacrylate, butyl methacrylate or 2-ethylhexyl methacrylate.

The higher the polymerization proportion of methyl methacrylate, the higher the meltability of the resin. On the other hand, if it exceeds 50 wt %, the melted resin tends to stick to the screw or die, or the resin adhered in the extruder tends to remain, thus leading to heat deterioration. On the other hand, if the polymerization proportion of methyl methacrylate is lose than 20 wt %, the meltability tends to be low, and uniform kneading tends to be difficult. Namely, in order to prevent adherence to metal without impairing the meltability and to secure uniform kneading, it is important that the proportion of methyl methacrylate is within a range of from 20 to 50 wt %.

The proportion of the acrylic resin is usually within a range of from 0.5 to 30 parts by weight, preferably from 0.5 to 20 parts by weight, more preferably from 1 to 12 parts by weight, per 100 parts by weight of the vinyl chloride resin. If the proportion is less than 0.5 part by weight, the meltability of the resin composition tends to be poor. On the other hand, if it exceeds 30 wt %, the resin composition tends to be hard, and although the extrusion moldability may be good, the molded product tends to have poor elasticity and lack in practical usefulness.

It is advisable to incorporate a filler to the vinyl chloride resin composition of the present invention within a range not to impair the compression set property. The filler has a function to absorb an excess amount of the plasticizer and to facilitate the kneading and molding. The filler may, for example, be carbon black, calcium carbonate, titanium oxide, talc, aluminum hydroxide, magnesium hydroxide, hydrotalcite, clay, silica or white carbon.

The filler is added usually in an amount within a range of at most 150 parts by weight, preferably from 10 to 120 parts by weight, per 100 parts by weight of the vinyl chloride resin. If the mount of the filler is too small, the effects for improving the kneading and molding properties tend to be small, and if it exceeds 150 parts by weight, the moldability tends to be poor. Therefore, it is preferred to incorporate it within a range not to impair the moldability, also from the economical viewpoint.

In addition to the above components, various known additives such as a flame retardant, a stabilizer, a lubricant, an antioxidant, a ultraviolet absorber, a blowing agent and a colorant, may be added to the vinyl chloride resin composition of the present invention, as the case requires, within a range not to deteriorate the physical properties of the composition.

The flame retardant may, for example, be antimony trioxide, zinc borate, barium methaborate, aluminum hydroxide, magnesium hydroxide, zirconium hydroxide, dosonide, calcium aluminate, red phosphorus, zinc stannate, zinc hydroxy stannate, or a molybdenate.

The vinyl chloride resin composition of the present invention may be prepared by introducing into a mixer or a kneader predetermined amounts of the vinyl chloride resin, the plasticizer, the rubber material or the rubber material containing a gel content insoluble in THF, if necessary, together with a crosslinking agent, and the acrylic resin containing from 20 to 50 wt % of methyl methacrylate, and, if necessary, the above mentioned various additives and uniformly mixing or kneading the mixture while heating it at a temperature within a range not to deteriorate the vinyl chloride resin, for example, at a temperature from 100 to 230° C., preferably from 130 to 230°.

The apparatus to be used for mixing the above components may be any apparatus so long as the components can substantially uniformly be mixed, and it may, for example, be a mixer such as a Henschel mixer, ribbon blender or planetary mixer. To knead the mixture, an apparatus capable of kneading the mixture under a shearing force while heating, such as an extruder, a roll mill, a Banbury mixer or a kneader, may, for example, be employed. As a kneading method, it is possible to employ a method wherein by means of an extruder having multistage inlets, the resin components and various additives are introduced in a first stage, and the plasticizer is injected in a later stage. In the method of increasing the gel content of the rubber material during the preparation of the composition, it is advisable to employ a closed type mixer such as a Banbury mixer, an intensive mixer or pressure kneader or twin screw extruder, since a large kneading effect can thereby be obtained.

The vinyl chloride resin composition of the present invention thus prepared may be processed into various molded products such as gaskets (inclusive of packings and sealing materials), tubes, hoses, thermal insulating boards, partition walls, floor coverings or electric wire coatings, by conventional molding methods such as extrusion molding, injection molding, rotational molding, press molding and calender rolling.

The composition of the present invention will not remain in the extruder at the time of extrusion molding, and its molded product is free from edge damage. Thus, it is very useful particularly as a resin composition for extrusion molding.

Now, the vinyl chloride resin composition of the present invention will be described in further detail with reference to Examples. However, it should be understood that the present invention is by no means restricted to such specific Examples.

EXAMPLES 1 to 3 and COMPARATIVE EXAMPLES 1 and 2

100 parts by weight of a vinyl chloride resin (average degree of polymerization: 2350), 58 parts by weight of a diisononyl phthalate, 5 parts by weight of epoxidized soybean oil, 1 part by weight of a phosphite type chelator, 2 parts by weight of a Ba—Zn type composite stabilizer, 2 parts by weight of synthetic hydrotalcite, 0.4 part by weight of stearic acid, 30 parts by weight of calcium carbonate, 1 part by weight of a black pigment and the predetermined parts by weight of the acrylic resin as identified in Table 1, were dried up at a resin temperature of up to 95° C. in a Henschel mixer having a capacity of 20 l, and then 80 parts by weight of NBR (PNC 38, manufactured by Japan Synthetic Rubber Co., Ltd.) containing 75 wt % of a gel content, was introduced thereto, followed by stirring for 30 seconds. The amounts charged were adjusted so that the total amount would be about 4 kg.

Then, 3.7 kg of the mixed resin composition was kneaded at a resin temperature of up to 165° C. in a Banbury mixer having a capacity of 3.6 l and then sheeted by a 9 inch roll mill followed by sheet-cutting to obtain pellets, which were subjected to evaluation of the quality. The results are shown in Table 1.

QUALITY EVALUATION

1. Extrusion test

The above pellets were extrusion-molded by means of an extruder of 20 mmφ, whereupon the edge damage of the molded product was evaluated.

Temperature (° C.): C1 140, C2 150, C3 160, D 160

Screen: one screen of 80 mesh

Screw: CR (compression ration)=2.4, L/D=22

Number of rotations: 5 rpm

Die: 0.5 mm in thickness, 20 mm in width

Evaluation: O no edge damage observed; X edge damage observed. 2. Static heat stability test In accordance with JIS K6723, the decomposition time of the pellets at 190° C. was measured by a color change of Congo Red.

3. Dynamic heat stability test 60 g of the pellets were introduced into 60 ml of a Laboplastomill (mixer for kneading, manufactured by Toyo Seiki KK) and stirred at 200 ° C. at 80 rpm, whereby the time at which the stationary torque changed abruptly, was taken as the decomposition time.

4. Compression set property

Measured in accordance with JIS K6301.

The acrylic resins used were as follows.

| Methablene P700 (manufactured by Mitsubishi Rayon Co., Ltd.) | | |
|---|---|---|
| Proportions: | methyl methacrylate | 30–45 wt % |
| | an acrylate | 15–30 wt % |
| | styrene | 35–55 wt % |
| Methablene P551A (manufactured by Mitsubishi Rayon Co., Ltd.) | | |
| Proportions | methyl methacrylate | 70–90 wt % |
| | an acrylate | 30–10 wt % |

TABLE 1

| | Examples | | | Comparative Examples | |
|---|---|---|---|---|---|
| | 1 | 2 | 3 | 1 | 2 |
| Acrylic resin | | | | | |
| P700 | 3 | 6 | 9 | — | — |
| P551A | — | — | — | — | 6 |
| Quality evaluation | | | | | |
| Extrusion moldability | O | O | O | X | O |
| Static heat stability (min) | 205 | 204 | 205 | 204 | 205 |
| Dynamic heat stability (min) | 49 | 47 | 47 | 39 | 38 |
| Compression set (%) | 43 | 44 | 44 | 43 | 44 |

To the vinyl chloride resin composition of the present invention, an acrylic resin having a relatively small content of methyl methacrylate, is incorporated, whereby the composition has little stickiness to metal, and it does not adhere to the screw or die of the extruder, so that long run extrusion molding has been made possible. Further, the resin composition does not remain in the extruder, and the molded product is free from edge damage, whereby stabilized extrusion molding has been made possible.

Further, the composition is excellent is the dynamic heat stability i.e. the heat stability during kneading or extrusion molding, and a molded product obtained from the composition of the present invention is excellent in creep resistance and compression set properties. Thus, the composition of the present invention is useful particularly for application to gaskets or the like.

What is claimed is:

1. A vinyl chloride resin composition comprising 100 parts by weight of a vinyl chloride resin, from 20 to 200 parts by weight of a plasticizer, from 10 to 250 parts by weight of a rubber material containing from 20 to 95 wt % of a gel content insoluble in tetrahydrofuran, and from 0.5 to 30 parts by weight of an acrylic resin obtained by copolymerizing from 20 to 50 wt % of methyl methacrylate with from 80 to 45 wt % of at least one monomer selected from the group consisting of an acrylate, a methacrylate (other than methyl methacrylate) and styrene.

2. The vinyl chloride resin composition according to claim 1, wherein the rubber material is acrylonitrilebutadiene rubber or acrylic rubber.

3. The vinyl chloride resin composition according to claim 1, which contains a filler.

4. The vinyl chloride resin composition according to claim 1, which contains a filler in an amount within a range of from 10 to 120 parts by weight per 100 parts by weight of the vinyl chloride resin.

5. The vinyl chloride resin composition according to claim 1, which contains a flame retardant.

6. A gasket obtained by molding a vinyl chloride resin composition as defined in claim 1.

* * * * *